US005544688A

United States Patent [19]

Freigang et al.

[11] Patent Number: 5,544,688
[45] Date of Patent: Aug. 13, 1996

[54] TWO STAGE KNEELING VALVE

[75] Inventors: Alan R. Freigang, Scotts; Gary R. Schultz, Kalamazoo; Thomas L. Runels, Battle Creek; Kurt R. Gerlofs, Kalamazoo, all of Mich.

[73] Assignee: Eaton Corporation, Cleveland, Ohio

[21] Appl. No.: 363,134

[22] Filed: Dec. 23, 1994

[51] Int. Cl.⁶ .......................... B60C 23/00; F16K 31/528
[52] U.S. Cl. ...................... 152/415; 137/224; 251/83
[58] Field of Search ..................... 152/415, 427, 152/429; 251/83; 137/230, 505, 224

[56]         References Cited

U.S. PATENT DOCUMENTS

| | | | |
|---|---|---|---|
| 529,588 | 11/1894 | Bridges | 137/234 |
| 1,415,407 | 5/1922 | Schweinert et al. | 137/234 |
| 1,429,047 | 9/1922 | Payne | 137/69 |
| 3,537,469 | 11/1970 | Hagar | 137/116 |
| 3,747,629 | 7/1973 | Bauman | 137/505 X |
| 4,015,623 | 4/1977 | Wanstreet | 137/224 |
| 4,640,331 | 2/1987 | Braun et al. | 152/417 |
| 4,782,879 | 11/1988 | Le Chatelier et al. | 152/417 |
| 4,922,946 | 5/1990 | Boulicault | 137/102 |
| 5,261,471 | 11/1993 | Freigang et al. | 152/415 |
| 5,398,744 | 3/1995 | Street et al. | 152/415 X |

Primary Examiner—Michael W. Ball
Assistant Examiner—Francis J. Lorin
Attorney, Agent, or Firm—Jennifer M. Stec; Howard D. Gordon

[57]                ABSTRACT

A pressure relief valve (61) including a body (110, 114) interconnecting an inflatable volume (20a,22a) with a source of pressurized fluid (30) and the atmosphere. A pair of valve members (120, 122) cooperate to allow controlled inflation and deflation of the volumes (20a,22a) as well as to close off the fluid path between the source and the volumes and vent fluid from the volumes to the atmosphere in order to achieve at least two predetermined fluid pressures in the volume.

13 Claims, 5 Drawing Sheets

TWO STAGE KNEELING VALVE

BACKGROUND AND SUMMARY OF THE INVENTION

This invention relates generally to a selectively operative relief valve useful in significantly reducing tire pressure in order to reduce the overall height of a vehicle and, more particularly, to such a valve employed as part of a central tire inflation system (CTI system or CTIS).

It is often desirable to reduce the overall height of a vehicle for transport. One way to accomplish this is to remove air from the vehicle tires in order to decrease the tire profile and thereby the overall vehicle height. While a tire pressure relief valve directed toward this purpose has heretofore been disclosed in U.S. Pat. No. 5,281,471 entitled "Pressure Relief Valve", incorporated herein by reference, this valve facilitates tire deflation to only a single predetermined tire pressure. The present invention provides an improvement over this previous valve in that it is a two stage valve, allowing deflation to either of two predetermined tire pressures. This feature is particularly useful in allowing vehicle height to remain consistent regardless of whether or not the vehicle is carrying a load. The valve design further allows for adjustment of the higher pressure setting in the assembled valve, thereby reducing the accuracy required in individual valve components as well as making the valve adaptable to varying load weights.

Like the previous valve, the two stage kneeling valve of the present invention is particularly adapted for use in conjunction with a central tire inflation system, such as those disclosed in U.S. Pat. Nos. 4,640,331; 4,878,017; 4,754,792; 4,782,879; 4,804,027; 4,883,106; 4,898,216; 4,922,948; 4,924,928; and published European Patent Applications 0,297,837; 0,352,921; and U.S. patent application Ser. Nos. 726,087 filed Jul. 5, 1991, and 753,562 filed Sep. 3, 1991, and 792,552 filed Nov. 15, 1991, the disclosures of which are incorporated herein by reference. Each of these systems allow a vehicle operator to remotely control the air pressure in vehicle tires. The present valve allows tire deflation to pressures below the preprogrammed pressure limits of the CTIS.

In addition to use in conjunction with such a CTI system, the present valve is equally well suited for use in an inflation only tire pressure maintenance system (TPMS) in order to provide an inexpensive manually controllable deflation capability. The resulting system could be configured to allow three tire pressure settings (such as highway, off-highway and extreme condition settings) and would be operable in a fashion analogous to manually actuatable front hubs on a four-wheel drive system.

The valve includes a body fluidly coupled between a source of pressurized fluid, an inflatable volume such as a tire and the atmosphere. A first valve member is disposed in the body and movable between open and closed positions. In a closed position air is allowed to flow between the pressurized fluid source and the inflatable tire volume so as to allow further inflation or deflation. In the open position a passageway is created between the inflatable volume and the atmosphere in order to effect venting of air from the tire to lower tire pressure to one of two predefined levels. A first pressure level is controlled by a first biasing means which permits venting only until tire pressure is no longer above that necessary to overcome the biasing force.

A second predetermined pressure level is also effected with a second biasing means acting in cooperation with the first biasing means. The first and second biasing means provide venting only until pressure exerted thereby exceeds tire pressure, this second pressure being higher than that effected by the first biasing means acting alone.

The selectively operative relief valve disclosed hereinafter may thus be employed to reduce tire pressure to one of two predetermined pressure levels, in vehicles with or without CTI systems, in order to thereby reduce overall vehicle height and/or improve mobility. These and other advantages of the present invention will become apparent upon review of the following description taken in conjunction with the accompanying drawings.

DETAILED DESCRIPTION OF THE PREFERRED EMBODIMENT

Figure 1:
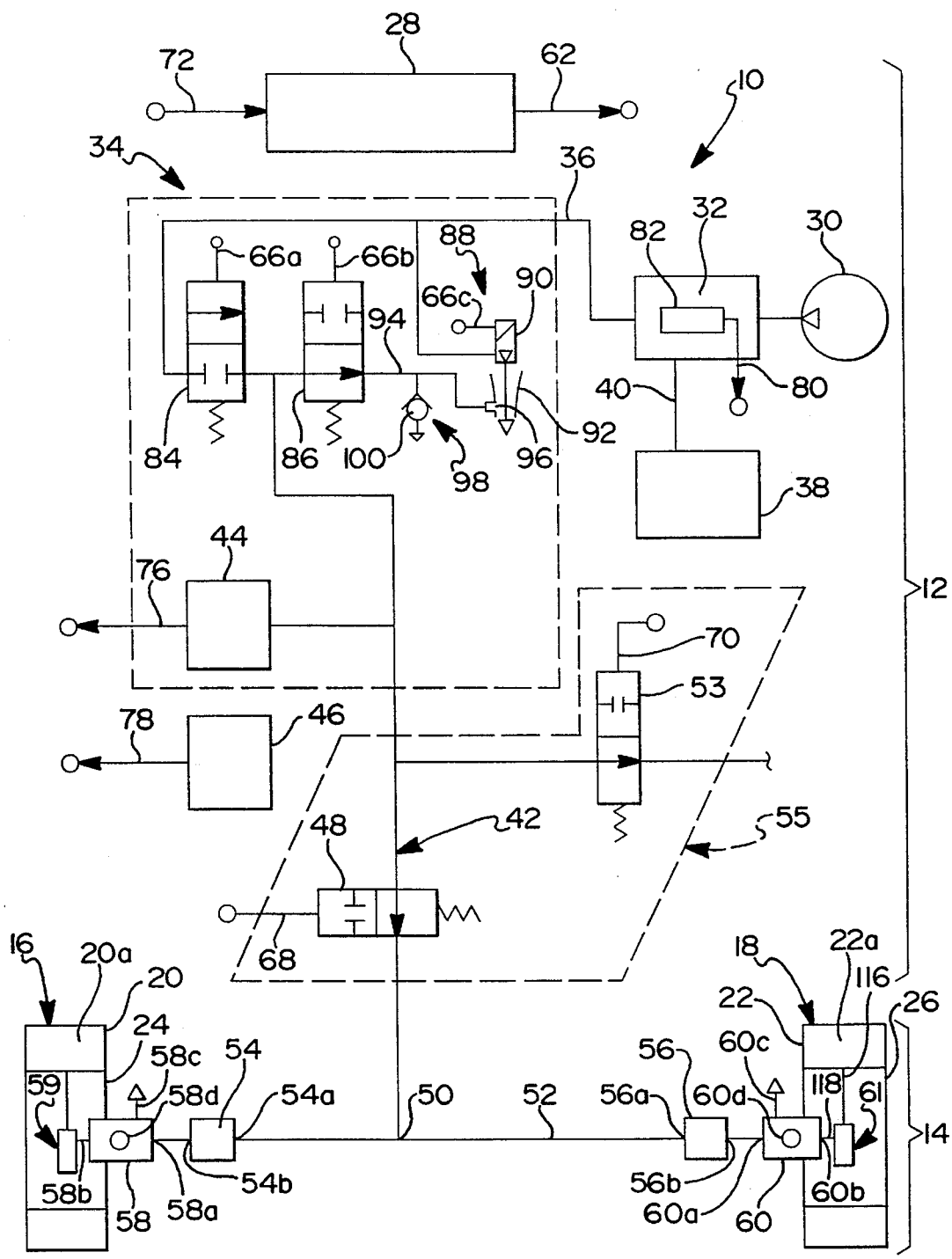
FIG. 1 is a schematic illustration of components of a CTI system with which the present valve may be employed.

Turning now to the drawings, the schematic of FIG. 1 illustrates a CTIS 10 generally of the type with which the valve of the present invention may be used. However, it should become readily apparent that the present valve is equally well suited for implementation in conjunction with various other types of CTI systems, such as the military oriented systems described in U.S. Pat. No. 4,640,331 incorporated herein, as well as in vehicles without any CTI system as a tire pressure maintenance system.

CTIS 10 includes body/chassis mounted components 12 as well as axle mounted components 14. Axle mounted components 14 include left and right wheel assemblies 16 and 18 which may be attached to a steer or nonsteer axle, a drive or nondrive axle and/or a tandem axle. The vehicle is preferably, but not necessarily, of the heavy duty truck type or special duty type and wheel assemblies 16 and 18 may be of the single or dual wheel type. In this exemplary embodiment, CTIS 10 measures and controls the inflation pressure of interior volumes 20a, 22a of tires 20, 22 mounted on wheels 24, 26 of wheel assemblies 16 and 18.

The chassis mounted components 12 of CTIS 10 include a microprocessor-based electronic control unit (ECU) 28 which generates electronic control signals based upon input signals received from a vehicle's operator, such as through a control panel (not shown), as well as from a number of additional sensors. A source of pressurized air, preferably a compressor 30, driven by the vehicle engine, provides pressurized air through an air dryer to a first air supply tank 32. Tank 32 serves as a reservoir for pressurized air provided by compressor 30 wherein pressure is allowed to build and additional moisture is removed. Clean, dry air from air supply tank 32 is provided directly to a pneumatic control unit (PCU) 34 via a conduit 36 as well as to the vehicle's brake system 38 via a conduit 40. PCU 34 is essentially a solenoid controlled manifold which in response to command signals received from ECU 28 controls the flow of air within CTIS 10. A vehicle speed sensor 46 provides ECU 28 with vehicle speed information.

PCU 34 has mounted thereto a pressure transducer 44 which provides an electrical signal to ECU 28 indicative of the pressure to which it is exposed. PCU 34 is fluidly connected to axle mounted components 14 via conduit 42 and a T-shaped connector 50 in a conduit 52 extending between left and right assemblies 16 and 18, Additional air valves 53 may be provided to fluidly connect PCU 34 with other axle assemblies.

Conduit 52 fluidly communicates with tire volumes 20a, 22a via rotary seal assemblies 54, 56, each seal having a non-rotatable port 54a, 56a and a rotatable port 54b, 56b. Examples of rotary seals of the type used herein may be seen by reference to U.S. Pat. Nos. 4,640,331; 4,804,027; 4,883,106 and 5,174,839. Wheel valves 58,60 each include an inlet port 58a, 60a which communicates with conduit 52 via the associated rotary seal and an outlet port 58b, 60b communicating with an associated tire volume via a relief valve 59, 61 preferably made in accordance with the teachings herein as explained in greater detail below. Preferably, each wheel valve includes valve means 58d, 60d for venting the associated tire volume to a vent or atmospheric opening 58c, 60c in response to a vent command from ECU 28. The atmospheric opening may be at the wheel valve, as disclosed in U.S. Pat. Nos. 4,678,017; 4,782,879; 4,922,946 or 5,253,687 remote from the wheel valve as disclosed in U.S. Pat. No. 4,640,331.

When the CTIS 10 is in an idle state, wheel valves 58 and 60 preferably isolate the tires from the inflation system in order to extend seal life by removing them from constant pressure. Wheel valves 58, 60 block air communication between tire volumes 20a, 22a and the associated valve inlets 58a, 60a and atmospheric openings 58c, 60c when air pressure at the inlet is substantially at atmospheric pressure. When the air pressure at inlets 58a, 60a is a predetermined pressure above atmospheric pressure, valve means 58d, 60d allow fluid communication between the tire volumes and conduit 52. When the air pressure at inlets 58a, 60a is a predetermined pressure less (vacuum) than atmospheric pressure, fluid communication between the tire volumes and the associated atmospheric openings 58c, 60c are allowed. Alternatively, however, CTIS 10 may be provided with wheel valves which are closed when air pressure at the inlets is substantially equal to atmospheric pressure, open for inflating the tires when the inlet air pressure is above a first predetermined minimum, and in a vent position when the inlet pressure is a predetermined pressure above atmospheric pressure and below tire pressure.

ECU 28 electronically controls the various pneumatic components of CTIS 10 by issuing command signals on an output 62. Output 62 is electrically connected to an operator control panel to pneumatic control unit 34 via conductors 66a, 66b, 66c and to axle valves 48, 53 via conductors 68, 70. The output signals are generated in response to input signals received by ECU 28 on an input 72. Input 72 receives signals from the control panel via a conductor, manifold pressure signals from pressure transducer 44 via a conductor 76, vehicle speed signals from speed sensor 46 via a conductor 78, and an air source pressure signal from a conductor 80 connected to a pressure switch 82 on air tank 32.

The operator control panel (not shown) preferably includes various light emitting push switches labeled "Highway", "Cross-Country", "Sand-Mud", "Emergency", and "Run Flat". Of course the control panel is preferably configured in accordance with a vehicle purpose and type and more or fewer switches may be provided, as may be suitable means for displaying current tire pressure, the selected mode or warning messages. Additional detail concerning such a panel may be seen by reference to U.S. Pat. No. 4,754,792 and published European Patent Application 0,297,837.

Pneumatic control unit 34 preferably includes a normally closed supply valve 84, a normally open control valve 86, a series of normally open valves that control each available tire group (i.e. valves 48 and 53), and a vacuum generator 88 which includes a deflate valve 90 connected between air tank 32 and a venturi 92. Supply valve 84 has an inlet fluidly connected to the positive pressure of the air source via conduit 36 and an outlet connected to all valves within PCU 34. Control valve 86 has an inlet connected to supply 84 and an outlet connected via a conduit 94 to an opening in the throat of venturi 92. All channel valves 48 and 53 have inlets connected to supply 84 and outlet connected to their respective channels.

The venturi 92 produces a vacuum or negative air pressure in conduit 94 relative to ambient atmospheric air pressure in response to a deflate signal from ECU 28 on conductor 66c which opens solenoid valve 90 to allow a stream of air from the air source to flow through the venturi. Conduit 94 is also connected to a one-way vent valve 98 for effecting rapid venting of positive air pressure in conduit 94. Vent valve 98 includes a valving member 100 forced to a closed position in response to a positive spring load and moved against a biasing force to an open position in response to positive pressure air in conduit 94.

CTIS 10, as thus described, is designed to automatically maintain tire pressure at or near a demand pressure $P_D$ as determined by ECU 28 based upon an operator selected pressure or mode of operation. The vehicle operator generally has the capability of commanding the system to decrease or increase tire pressure for improving tire traction or increasing load carrying capacity of the vehicle by merely activating the appropriate control panel switch. However, the system preferably automatically overrides the operator selected mode and increases tire pressure if the vehicle speed, as monitored by speed sensor 46, exceeds a predetermined speed for the selected tire pressure. CTIS 10 is similarly overridden by pressure switch 82 which acts as an electronic brake priority switch by preventing CTIS 10 from consuming air from air supply tank 32 unless the vehicle brake system 38 is fully charged. Therefore, switch 82 must be closed in order for CTIS 10 to perform any function other than one which does not consume additional air.

When the vehicle ignition is energized and pressure switch 82 is closed, ECU 28 initiates a pressure check sequence of the tires on each of the axle assemblies. In addition, during vehicle operation, ECU 28 automatically initiates periodic pressure check sequences to maintain the desired pressure. If the pressure of tires on any of the axles is found to be a predetermined amount less than demand pressure $P_D$ for that axle, an inflation sequence is initiated for the axle or axles effected.

When enhanced or maximum traction is required, the vehicle operator may command reduced tire pressure by pushing the appropriate switches on control panel 29. ECU 28 then initiates a deflate sequence unless the vehicle speed indicated by sensor 46 is greater than a predetermined amount for the selected reduced pressure. A tire inflation sequence is similarly initiated if an increased load or terrain change lead the operator to push a switch corresponding to a higher demand pressure. A pressure check sequence may also be initiated at certain points in the middle of the inflate and deflate modes.

When CTIS 10 is in a steady state, neither inflating, deflating or performing a pressure check, valves 84, 86 and axle valves 48, 53 are in the positions indicated in FIG. 1. With vacuum source solenoid valve 90 closed, conduit 42, conduit 52 and each of the rotary seals 54, 56 are vented to atmosphere through vacuum generator 88 and vent valve 98 via control valve 86. Wheel valves 58, 60 have closed in response to this venting.

A pressure check sequence for tires that are part of axle mounted components 14 is initiated by energizing valves 86 and 53 to the closed positions and momentarily energizing valve 84 to the open position in order to provide a positive pilot air pressure sufficient to move valving means of wheel valves 58, 60 allow fluid communication between the inlets and outlets thereof. Subsequent de-energization closes valve 84. With valve 84 closed and valves 48, 58, 60 open, the pressure in conduit 42 and conduit 52 soon equalizes to tire pressure as long as the pressure pulse provided by air supply tank 32 to conduit 42 was greater than the pressure in the tires. ECU 28 reads this pressure via signals from pressure transducer 44, compares the current tire pressure $P_C$ to the calculated demand pressure $P_D$ and initiates inflate/deflate sequences as required. If no further sequence is required, control valve 86 is de-energized and returned to an open position, thereby connecting the wheel valve assembly inlet ports to the vent through vacuum generator 88 and vent valve 98.

This type of pressure check sequence is initiated when ECU 28 is in an inflating or deflating sequence to ensure arrival at $P_D$, or at least within some predefined range of $P_D$. The same general sequence is also used to check tire pressure periodically to ensure tire pressure stays within the predetermined range of $P_D$ as well as to alert the driver of any abnormal conditions.

With the elements and operation of CTIS 10 having thus been set forth, the relief valve of the present invention can now be described in detail. Referring now to FIGS. 2–9, a relief valve assembly according to the teachings of the present invention is indicated generally at 61. (Valve assembly 59 also shown in FIG. 1 is identical.) Valve assembly 61 includes a housing 110 having a cylindrical walled bore 110a formed substantially therethrough and terminating at a valve seat 110c. Housing 110 includes a first port 110b fluidly connected to tire inflatable volume 22a as well as to bore 110a via a central opening in valve seat 110c. Housing 110 also includes a second port 110d, in this exemplary embodiment disposed transverse to bore 110a, which is fluidly connected to a source of pressurized fluid via wheel valve outlet port 60b. In the event valve assembly 61 is employed in a vehicle not having a CTI system, port 110d may have a manual fill valve affixed therein or the port may be eliminated entirely if the tire is provided with a conventional manual fill valve.

A relief valve 112 is disposed within housing 110 and retained therein by a cap 114 and an annular adjustment ring 116 which fits between housing 110 and cap 114. Relief valve 112 includes a plunger 120 disposed in a substantially cylindrical outer valve body 122. Valve body 122 has an outer cylindrical surface 122b with an o-ring seal 130 disposed in an annular groove formed therein so as to put body 122 in sliding sealing cooperation with the inner cylindrical wall of bore 110a. A first end 122c of body 122 has an annular seal 132 affixed thereto with an opposite end defining a valve seat 122d. A castellated skirt portion extends upwardly from seat 122d with two recesses 122e formed therein which are circumferentially separated by a pair of fingers 122f (see FIG. 8). A stepped central through opening 122g including a shoulder 122h extends from first end 122c to second end 122d of the valve body.

Plunger 120 includes a stem portion 120a slidably disposed in opening 122g with sufficient clearance to allow relatively free flow of air therealong. A plunger head portion 120b carries an o-ring seal 134 which is operative when engaged with valve seat 122d to prevent air flow along stem 120a. A helical compression spring 136 is compressed between shoulder 122h and a retainer 138 preferably threadably attached to stem 120a. Valve body 122 in the "closed" position shown in FIG. 2 allows a free flow of air between ports 110b and 110d while preventing the flow of air from port 110b to the atmosphere along plunger stem 120a. In this position, the relief valve assembly 61 is essentially transparent to the operation of CTIS 10.

A valve actuation member 126 disposed atop valve body 122 includes a disk portion 126a having a stop 126b extending downwardly from the center thereof with a rounded elastomeric tip 140 affixed thereto. A pair of fingers 126c extend downwardly from the outer periphery of disk 126a and are received in valve body recesses 122e. Two pie-shaped raised portions 126d are formed on the upper surface of actuator 126 and two vent holes 126e open into pie-shaped valleys between raised portions 126d. A second actuation member 128 is positioned above actuator 126 and includes a disk portion 128a having a downwardly extending rail 128b which fits between pie-shaped portions 126d of actuator 126. A pair of vent holes 128c extend through disk 128a. A spring 148 is compressed between actuator 126 and plunger head 120b, spring 148 preferably fitting around the circumference of stop 126b. Actuators 126 and 128 are secured in place with respect to cap 114 by a retaining ring 125.

Figure 3:
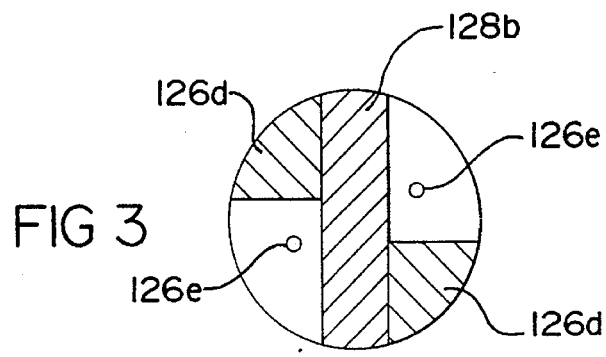
FIG. 3 is a partial cross-sectional view of the valve in FIG. 2 taken along line 3—3.
Figure 2:
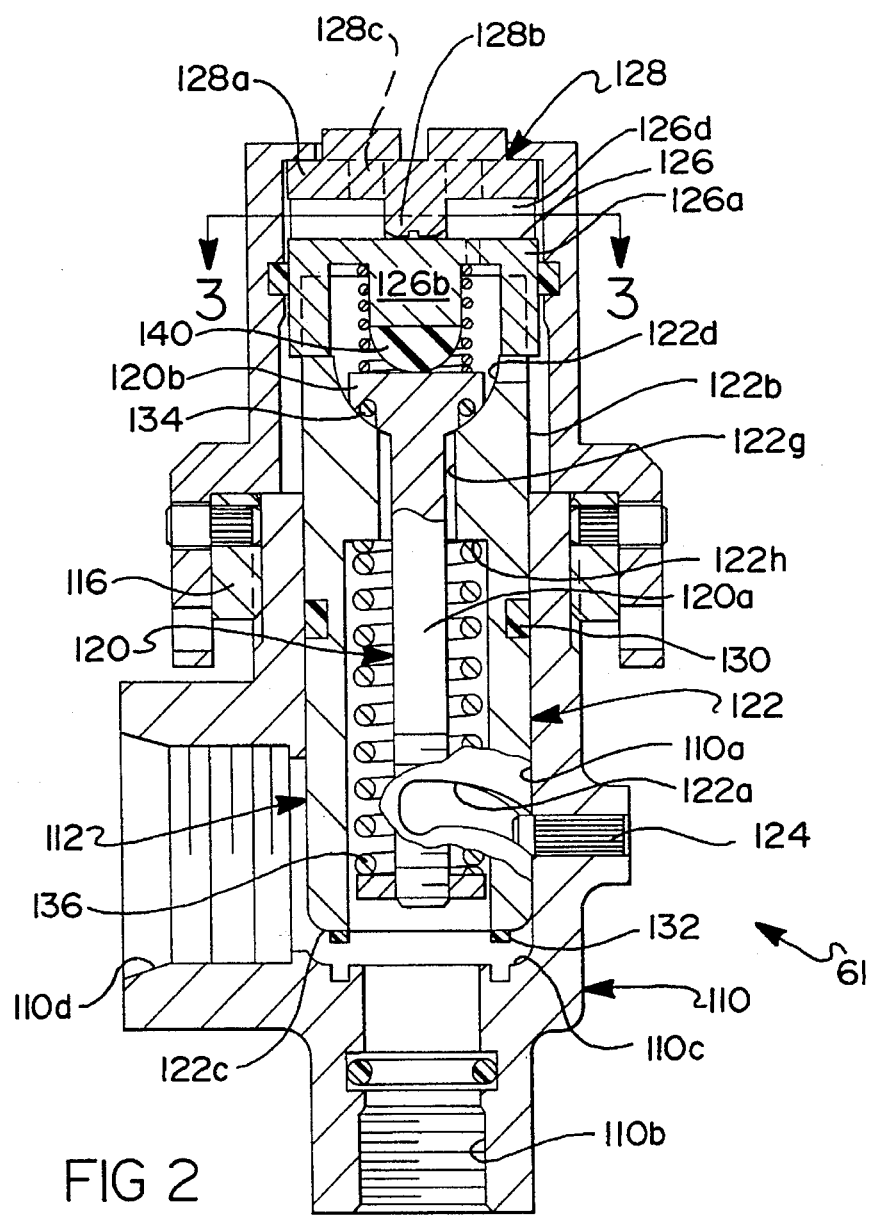
FIG. 2 is a cross-sectional view of the present relief valve taken generally through the center thereof, the valve illustrated in a closed position.
Figure 5:
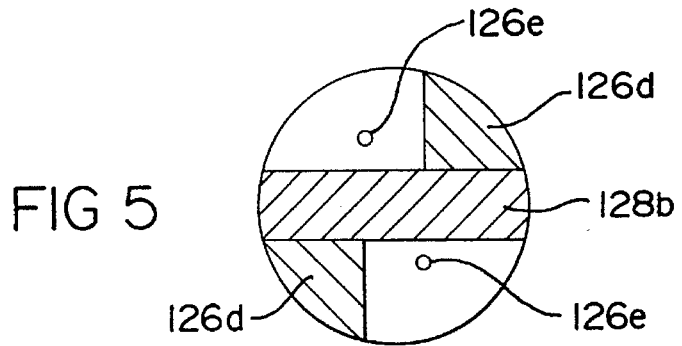
FIG. 5 is a partial cross-sectional view of the valve in FIG. 4 taken generally along line 5—5.
Figure 4:
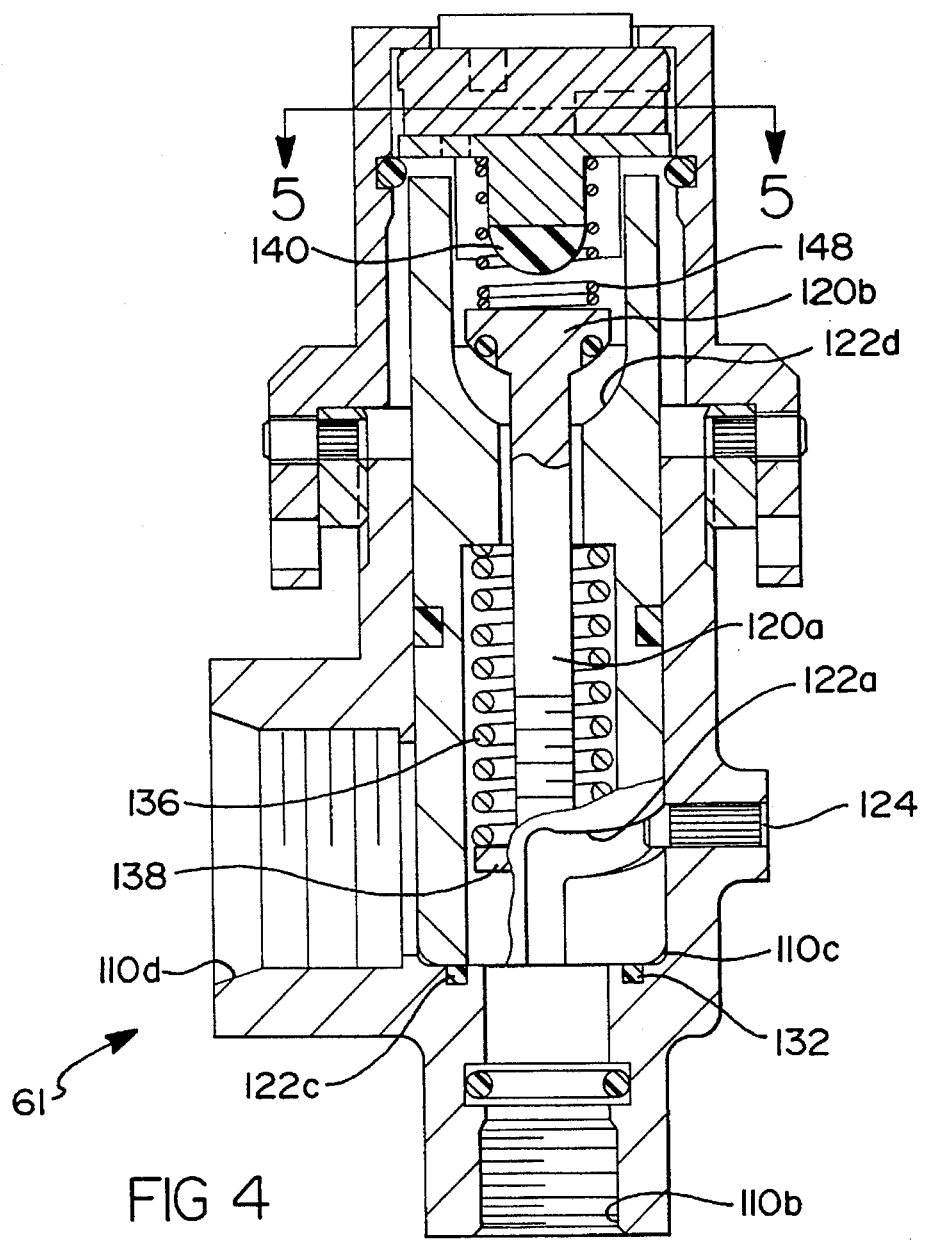
FIG. 4 is a cross-sectional view of the relief valve similar to FIG. 2 but showing the valve in a loaded pressure position.

In the closed position shown in FIGS. 2 and 3, the upper surface of raised portions 126d block vent holes 128c and valve body 122 is positioned within housing 110 to provide a path through which air may flow between ports 110b and 110d. The elastic tip 140 on stop 126b contacts plunger head 120b so as to prevent opening thereof irrespective of the air pressure acting upon a lower surface of plunger head 120b. In the full upmost position of valve body 122, a pin 124 is maintained at one end of a cam slot 122a formed in outer valve body surface 122b by a detent 142 formed therein (see FIG. 8).

To effect a first partially vented position (shown in FIGS. 4 and 5), preferably corresponding to a tire pressure appropriate for reducing the overall height of a loaded vehicle, actuator 128 is rotated one hundred and eighty degrees counterclockwise from the closed position illustrated in FIGS. 2 and 3. Actuation member 128 may be rotated by using a screwdriver or other suitable device in a slot 128d formed in the top surface of member 128. Alternatively, member 128 may be rotated by a suitable electrical or hydraulic device, and may thus be controlled from a remote location.

When rotated, the sides of rail portion 128b of actuator 128 contact the sides of raised portions 126d to rotate valve body 122 ninety degrees counterclockwise and cause the combination of cam slot 122a and pin 124 to move valve body 122 in a downward direction within housing 110. Seal 132 thereby engages valve seat 110c to prevent air flow between ports 110b and 110d and stop 126c is positioned so as to allow upward movement of plunger 120 and venting of air from port 110b (at tire pressure) until the pressure decreases to a predetermined pressure.

In this position of valve body 122, pin 124 is maintained at an end of slot 122a by a detent 144 formed therein. Vent holes 128c are in fluid communication with hole 126e so as to allow air to flow out through the top of actuators 126 and 128 and into the atmosphere. This venting air flow is limited by a biasing force provided by spring 136 acting in combination with spring 148. Air flow ceases when air pressure exerted at port 110b on a bottom surface of plunger head 120b is insufficient to overcome the force exerted by springs 136 and 148. At this point plunger head 120b is moved downwardly onto valve seat 122d, so as to prevent further venting.

Figure 7:
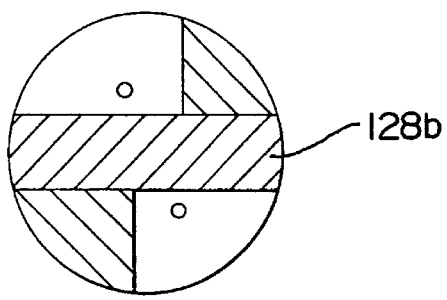
FIG. 7 is a partial cross-sectional view of the valve as shown in FIG. 6, taken generally along line 7—7.
Figure 6:
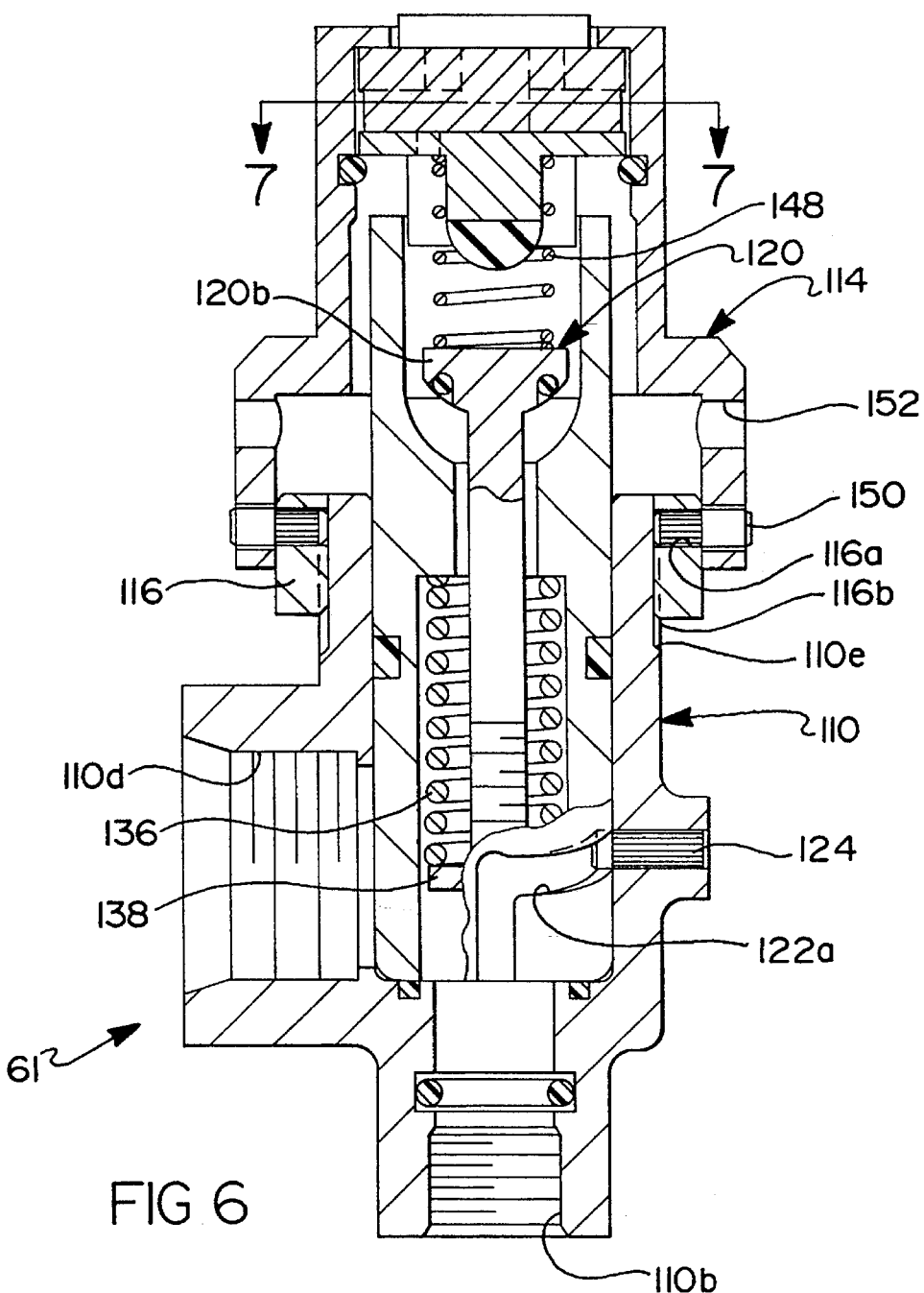
FIG. 6 is a cross-sectional view similar to FIGS. 2 and 4 illustrating the valve in an unloaded pressure position.
Figure 9:
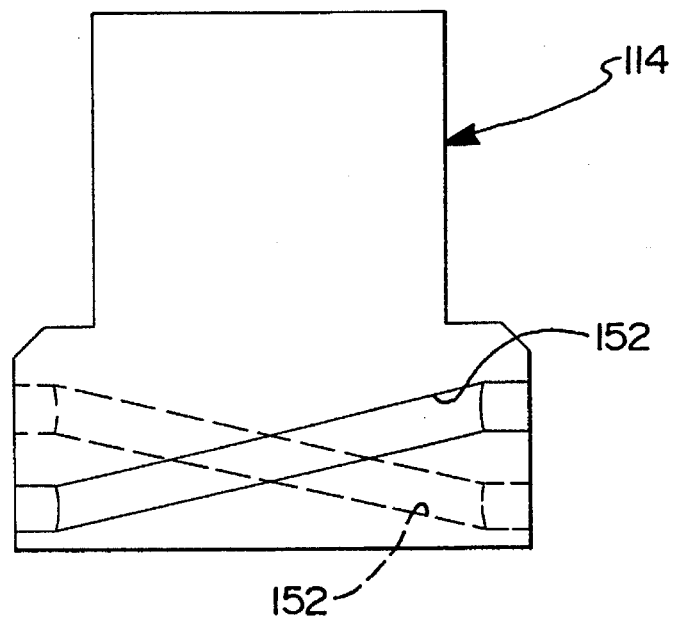
FIG. 9 is a side view of the valve cap.
Figure 8:
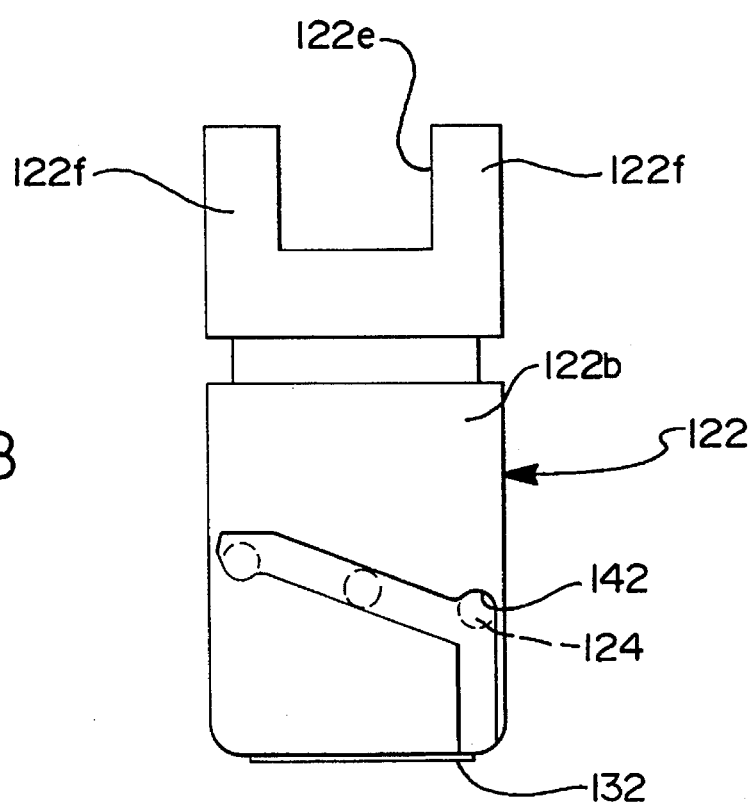
FIG. 8 is a side view of the inner relief valve.

A second vented position, preferably to provide a tire pressure appropriate for reducing the overall height of an unloaded vehicle (therefore less than that necessary to lower a heavier loaded vehicle to the same height), is shown in FIGS. 6 and 7. This position is effected by rotating cap 114 ninety degrees further in a counterclockwise direction. This rotation causes each of cam pins 150 to move with in a corresponding cam slot 152 and results in cap 114 moving axially upward and away from housing 110. Pins 150 remain stationary in holes 116a in adjustment ring 116 which remains fixed in position with respect to housing 110. Valve body 122 remains in the same position with respect to housing 110 as in the loaded position shown in FIGS. 4 and 5, with pin 124 remaining stationary in position within cam slot 122a.

This movement of cap 114 away from housing 110 removes spring 148 from compression between the upper surface of plunger head 120a and actuator 126. In this position fluid flows upwardly out of valve 61 until pressure at port 110b (tire pressure) acting upon a lower surface of plunger head 120b becomes insufficient to overcome the opposing biasing force of spring 136 only. Thus, the desired unloaded tire pressure is set via the compression strength of spring 136 and achieved by moving cap 114, and therefore actuator 126, a sufficient distance to remove spring 148 from compression.

Assembly of valve 61 to achieve the desired loaded and unloaded pressures begins with assembly of valve body 122 and pin 124 into housing 110. A cap assembly which includes cap 114, actuators 126 and 128, spring 148, adjustment ring 116 and cam pins 150 is screwed onto housing 110 while positioned in a test fixture. Threaded surfaces 116b and 110e, of adjustment ring 116 and housing 110, respectively, are engaged until cap 114 is positioned relative to housing 110 so as to provide a removal of spring 148 from the upper surface of plunger head 120b upon rotation of cap 114 to position each of pins 150 in an opposite detented end 152a of a corresponding slot 152. The fixture preferably provides a source of pressurized air as well as a measure of pressure. Cap 114 is then tightened until spring 148 has engaged the plunger head 120b and the desired pressure is achieved.

Valve 61 is contemplated for use in vehicle CTI systems having wheel valves, such as valves 58, 60 or the like, which isolate the tire volumes from the on-board source of air pressure, in continuous pressure CTI systems not having wheel valves and continuously communicating the on-board source of air pressure with the tire volumes, and in vehicles not having CTI systems. Valve 61 can be incorporated in CTI systems not having a means to lower tire pressure to amounts less than a predetermined minimum pressure in allowing this additional reduction in pressure will aid vehicle travel in extreme terrain conditions and/or height reduction.

The present two stage kneeling valve thus provides for two different pressure settings, with the higher pressure setting being adjustable via rotation of cap 114 and adjustment ring 116 even after valve assembly. In addition, the present two stage kneeling valve preferably utilizes components of the previously disclosed single stage valve and can be easily implemented in place thereof.

The foregoing discussion discloses and describes an exemplary embodiment of the present invention. One skilled in the art will readily recognize from such discussion, and from the accompanying drawings and appended claims, that certain changes, modifications and variations can be made therein without departing from the spirit and scope of the present invention as defined in the following claims.

What is claimed is:

1. A valve assembly comprising:
    a body including:
        a first port in fluid communication with a volume of pressurized fluid;
        a second port fluidly connected to a source of pressurized fluid for increasing the fluid pressure in said volume; and
        a third port for controlling the venting of pressurized fluid from said volume to the atmosphere;
    a first valve member disposed in said body and movable to alternately allow and prevent fluid flow between said first and second ports;
    a second valve member movably disposed substantially within said first valve member to selectively permit fluid flow from said first port to said vent port when said first valve member prohibits fluid flow between said first and second ports;
    first biasing means for bringing the fluid pressure in said volume to a first predetermined pressure by acting upon said second valve member to allow fluid flow until pressure at said first port is insufficient to overcome the force exerted by said first biasing means; and
    second biasing means for selectively acting in cooperation with said first biasing means to bring said volume pressure to a second predetermined pressure by allowing fluid flow until pressure at said first port is insufficient to overcome the force exerted by the combination of said first and second biasing means.

2. The valve of claim 1 wherein said first biasing means comprises a spring.

3. The valve of claim 1 wherein said second biasing means comprises a spring.

4. The valve of claim 1 further comprising first actuation means for moving said first valve member.

5. The valve of claim 4 wherein said first actuation means includes a pin and cam slot.

6. The valve of claim 1 further comprising means for selectively engaging and disengaging said second biasing means.

7. The valve of claim 6 wherein said means for selectively engaging includes a pin and cam slot.

8. The valve of claim 1 wherein said first predetermined pressure is less than said second predetermined pressure.

9. The valve of claim 1 wherein said valve is employed on a vehicle and wherein said volume of pressurized fluid is an inflatable tire.

10. The valve of claim 9 wherein said vehicle includes an on-board tire inflation system.

11. The valve of claim 9 wherein said first predetermined pressure is appropriate for reducing the overall height of an unloaded vehicle.

12. The valve of claim 9 wherein said second predetermined pressure is appropriate for reducing the overall height of a vehicle carrying a load.

13. The valve of claim 6 further comprising means for adjusting said means for selectively engaging and disengaging in order to adjust said second predetermined pressure.

* * * * *